United States Patent [19]

Sawamura et al.

[11] Patent Number: 4,587,231

[45] Date of Patent: May 6, 1986

[54] METHOD OF PRODUCING MONOLITHIC CATALYST FOR PURIFICATION OF EXHAUST GAS

[75] Inventors: Keiichi Sawamura; Yoshiyuki Eto; Junichi Mine, all of Yokohama; Koji Masuda, Yokosuka, all of Japan

[73] Assignee: Nissan Motor Co., Ltd., Yokohama City, Japan

[21] Appl. No.: 671,714

[22] Filed: Nov. 15, 1984

[30] Foreign Application Priority Data

Nov. 21, 1983 [JP] Japan .................. 58-217687

[51] Int. Cl.$^4$ .......... B01J 21/04; B01J 21/06; B01J 23/10
[52] U.S. Cl. .................. 502/304; 423/213.5
[58] Field of Search .............. 502/304; 423/213.5

[56] References Cited

U.S. PATENT DOCUMENTS

| | | | |
|---|---|---|---|
| 3,850,847 | 11/1974 | Graham et al. | 502/304 X |
| 3,993,572 | 11/1976 | Hindin et al. | 502/304 |
| 4,206,087 | 6/1980 | Keith et al. | 252/462 |
| 4,294,726 | 10/1981 | Bozon et al. | 252/462 |
| 4,367,162 | 1/1983 | Fujitani et al. | 502/304 X |

Primary Examiner—W. J. Shine
Attorney, Agent, or Firm—Schwartz, Jeffery, Schwaab, Mack, Blumenthal & Evans

[57] ABSTRACT

A method of producing a monolithic three-way catalyst for the purification of exhaust gases of internal combustion engines. First, a mixed oxide coating is provided to a monolithic carrier by treating the carrier with a coating slip in which an active alumina powder containing cerium in oxide form is dispersed together with a ceria powder and then baking the treated carrier. Next, Pt, Rh and/or Pd are deposited on the oxide coating by a known thermal decomposition process. The addition of the ceria powder to the coating slip is effective in enhancing the CO, HC and $NO_x$ conversions and durability of the produced catalyst at high temperatures. Preferably the content of Ce in the active alumina powder is 1-5 wt %, and, in the coating after baking, Ce of the ceria powder amounts to 5-50 wt % of the coating. Optionally a zirconia powder too may be added to the coating slip such that Zr of the zirconia powder amounts to 1-10 wt % of the coating.

4 Claims, No Drawings

METHOD OF PRODUCING MONOLITHIC CATALYST FOR PURIFICATION OF EXHAUST GAS

BACKGROUND OF THE INVENTION

This invention relates to a method of producing a monolithic catalyst which is effective in simultaneously oxidizing carbon monoxide (CO) and hydrocarbons (HC) and reducing nitrogen oxides ($NO_x$) in exhaust gases of internal combustion engines, the catalyst being of the type comprising at least one kind of noble metal of the platinum group deposited on an active alumina base coating provided to a monolithic carrier.

Various catalysts and methods of producing them have been proposed and put into practical use for the purification of exhaust gases of internal combustion engines mounted on vehicles such as automobiles. Much interest has been attached to so-called three-way catalysts which are effective for simultaneous oxidation of CO and HC and reduction of $NO_x$. Conventional three-way catalysts generally employ noble metals of the platinum group, and particularly platinum, palladium and/or rhodium, as the principal catalytic component. In the current automobile industry, monolithic catalysts are preferred to granular catalysts.

A fundamental way of producing a three-way catalyst of the monolithic type is to first provide an active alumina base coating to the surfaces of a monolithic carrier which is formed of a ceramic material and has a honeycomb structure and then deposit platinum, palladium and/or rhodium on the active alumina base coating. Usually the deposition of the selected noble metal(s) is accomplished by pyrolysis of a suitable compound of each noble metal applied to the coated carrier as an aqueous solution. With a view to improving the activity and/or durability of the catalyst, it is known to introduce cerium in oxide form into the active alumina powder used as the principal material of the aforementioned coating (e.g., U.S. Pat. No. 4,206,087). Also it has been proposed to form an oxide of cerium, titanium, zirconium or the like metal on the active alumina coating initially provided to the monolithic carrier by pyrolysis of a suitable cerium, titanium or zirconium compound applied as a solution and then deposit a noble metal on the composite oxide coating (e.g. U.S. Pat. No. 4,294,726).

However, known three-way catalysts still need to contain relatively large amounts of noble metal(s) for attaining sufficiently high conversions of CO, HC and $NO_x$. Since noble metals of the platinum group are very expensive and limited in resources, it is unfavorable to consume large quantities of such metals in the exhaust gas purifying catalysts.

SUMMARY OF THE INVENTION

It is an object of the present invention to provide an improved method of producing a monolithic three-way catalyst comprising platinum, rhodium and/or palladium, which method has the effect of enhancing the activity and durability of the produced catalyst and makes it possible to considerably decrease the total quantity of the nobel metal(s) in the catalyst.

The present invention provides a method of producing a monolithic catalyst for simultaneous oxidation of CO and HC and reduction of $NO_x$ in exhaust gases of internal combustion engines, the method including the steps of providing an active alumina base coating to a monolithic carrier by treating the carrier with a coating slip in which an active alumina powder containing cerium in oxide form is dispersed and then baking the treated carrier, and depositing at least one noble metal selected from Pt, Rh and Pd on the coating by thermal decomposition of a compound of each selected noble metal on the coating. As the essential feature of the invention, a ceria powder is additionally dispersed in the aforementioned coating slip.

At high temperatures active alumina represented by $\gamma$-alumina and $\delta$-alumina generally turns into more stable $\alpha$-alumina, which does not belong to active alumina and is very smaller in specific surface area than active alumina. Therefore, when catalysts produced by deposition of a noble metal on substantially pure active alumina surfaces are kept at high temperatures the catalysts rapidly lose activity by reason that a sort of sintering of the noble metal accompanies the transformation of the active alumina to inactive alumina.

The introduction of cerium oxide or ceria into active alumina used as the carrier or fundamental coating material in the three-way catalyst is effective in suppressing the transformation of the active alumina to $\alpha$-alumina at high temperatures and accordingly produces an improvement in the high temperature resistance of the catalysts. Besides, it is favorable for the activity of the catalysts that ceria has an oxygen storage effect. That is, in an oxidizing atmosphere as in exhaust gases of internal combustion engines operated with a fuel-lean mixture, ceria captures oxygen until it completely turns into the theoretical form of $CeO_2$. In a reducing atmosphere as in exhaust gases of the engines operated with a fuel-rich mixture, ceria liberates oxygen to such an extent that ceria itself assumes an oxygen deficiency state. In a catalyst produced by the method according to the invention, ceria is allowed to fully exhibit its effects. Consequently a monolithic three-way catalyst produced by this method is remarkably higher in the CO, HC and $NO_x$ conversion efficiencies than resembling catalysts produced by known methods. Therefore, it becomes possible to greatly decrease the total quantity of Pt, Rn and/or Pd in the catalyst compared with conventional three-way catalysts of the like structure and like size. The catalysts produced by this method are fully practicable in automobiles in respect of not only activity but also durability.

As mentioned hereinbefore, it is known to provide an active alumina base coating containing ceria to a monolithic carrier by first coating the carrier surfaces with active alumina, next applying an aqueous solution of a cerium salt such as cerium nitrate to the alumina-coated carrier and then baking the carrier to cause thermal decomposition of the cerium salt to ceria. However, we have confirmed that a three-way catalyst obtained by the deposition of Pt, Rh and/or Pd on the thus produced ceria-containing coating is lower in the CO, HC and $NO_x$ conversions than the product of our method. A probable reason is that the formation of ceria by pyrolysis on the active alumina coating results in a considerable decrease in the effective surface area of active alumina so that the dispersibility of the subsequently deposited noble metal(s) becomes relatively low. By employing our method it is possible to make the catalyst contain a relatively large amount of ceria without obstructing good dispersion of the subsequently deposited noble metal(s).

In the method according to the invention, it is preferred that the active alumina powder used as the basic coating material contains 1-5 wt% of Ce (calculated as metal) in oxide form and that such a quantity of a ceria powder is used in addition to the Ce-containing active alumina powder in producing the coating on the monolithic carrier that Ce of the ceria powder amounts to 5-50 wt% of the coating completed by baking. When used in less amounts the effects of ceria remain insufficient. On the other hand, the use of larger amounts of ceria does not produce proportionate augmentation of the effects.

Optionally a zirconia powder may be added to the coating slip together with the ceria powder since zirconia too has the effect of aiding good dispersion of the noble metal(s) during the noble metal deposition process. In that case, it is suitable to use such an amount of zirconia powder that Zr of the zirconia powder amounts to 1-10 wt% of the completed coating, while the amount of the ceria powder is as described above. The use of a larger amount of zirconia powder does not produce proportionate augmentation of the effect.

DESCRIPTION OF THE PREFERRED EMBODIMENTS

A monolithic carrier for use in the present invention can be chosen from various monolithic carriers for conventional three-way catalysts. Usually the material of the monolithic carrier is a ceramic material though there is a possibility of using a corrosion resistant light metal alloy. A preferred carrier material is cordierite. Usually the monolithic carrier has a honeycomb structure in which the cross-sectional shape of the cells is not necessarily hexagonal.

An active alumina powder containing ceria can be obtained by a known method. For example, beads of active alumina are impregnated with an aqueous solution of cerium nitrate and, after drying, baked in air. The resultant Ce-containing active alumina beads are pulverized either before or after mixing with a ceria powder.

A coating slip according to the invention may contain a ceramic filler or extender material such as alumina besides the essential Ce-containing active alumina powder and cerium powder and an optional zirconia powder. It is convenient to use an aqueous alumina sol containing boehmite or hydrated alumina as the liquid medium for preparing the coating slip.

After the treatment with the coating slip and sufficient drying, the monolithic carrier is baked in air usually at a temperature in the range from about 500° C. to about 700° C. to thereby obtain an active alumina base coating which contains ceria and firmly adheres to the carrier surfaces.

The deposition of Pt, Rh and/or Pd on the active alumina base coating is accomplished by a well known thermal decomposition method using an aqueous solution of a suitable compound or compounds of the selected noble metal(s). The oxide-coated monolithic carrier is immersed in the solution, dried and then baked in air, steam or a combustion gas produced by burning, e.g., city gas at a temperature in the range from about 500° C. to about 650° C.

The invention will further be illustrated by the following nonlimitative examples.

EXAMPLE 1

To obtain active alumina containing ceria, use was made of a commercial catalyst carrier which was principally of γ-alumina and consisted of grains about 2-4 mm in diameter. The granular alumina was immersed in an aqueous solution of cerium nitrate, dried and then baked in air at 600° C. for 1 hr to thereby obtain granular active alumina containing 1 wt% of Ce (calculated as metal) in oxide form.

Next, a slurry-like mixture was prepared by mixing 1419 g of the Ce-containing active alumina grains with 103.2 g of a commercial ceria powder and 2478.0 g of an alumina sol which was obtained by adding 10 wt% solution of $HNO_3$ to an aqueous suspension containing 10 wt% of boehmite alumina. In a ball mill the slurry-like mixture was thoroughly mixed and ground for 6 hr to obtain an aqueous suspension of an active alumina base fine powder mixture. Herein, a suspension prepared in this manner will be called a coating slip.

The coating slip was applied to a monolithic honeycomb carrier formed of cordierite. The monolithic carrier had a gross volume of 1700 $cm^3$ and 400 cells per square inch of cross-sectional area and weighed about 900 g. The slip-coated monolithic carrier was drained, dried and then baked in air at 650° C. for 2 hr. The active alumina base coating thus formed on each monolithic carrier weighed 340 g. In this coating the quantity of Ce originating in the ceria-containing active alumina was 3.4 g, and the quantity of Ce of the added ceria powder was 17 g (5 wt%).

The thus treated monolithic carrier was immersed in an aqueous mixed solution of chloroplatinic acid and rhodium chloride, dried and then baked in a combustion gas at 600° C. for 2 hr to thereby deposit 0.77 g of metallic platinum and 0.13 g of metallic rhodium on the oxide-coated carrier.

EVALUATION TEST

The activity and endurance of the monolithic catalyst produced in Examlple 1 were evaluated by the following test.

The catalyst was disposed in the exhaust passage of a 2.2-liter automotive gasoline engine, and the engine was operated at a speed corresponding to the car speed of 100 km/hr for a total period of 100 hr. During the engine operation, the fuel was periodically cut off for 5 seconds every 60 seconds. In the catalyst the space velocity of the exhaust gas was about 70000 $hr^{-1}$. The exhaust gas temperature at the outlet of the catalyst was 750° C. The composition of the exhaust gas was as follows.

CO: 0.4-0.6 vol%
$O_2$: 0.4-0.6 vol%
NO: 2500 ppm
HC: 1000 ppm
$CO_2$: 14.8-15.0 vol%
$N_2$: balance After this endurance test, the HC, CO and NO conversion efficiencies of each catalyst were measured by operating the same engine in a 10-mode pattern with a nearly stoichiometric air-fuel mixture. The exhaust gas temperature at the location of the tested catalyst was in the range of about 270°-360° C. The results were as shown in Table 1.

The catalysts produced in the following examples were also subjected to the same test unless otherwise noted. The test results are shown in Table 1 together with the particulars of the respective catalysts.

EXAMPLES 2 AND 3

The coating slip of Example 1 was modified by increasing the ceria powder to 619 g in Example 2 and to 1032 g in Example 3 and decreasing the Ce-containing active alumina to 903 g in Example 2 and to 491 g in Example 3. Otherwise, the process of Example 1 was repeated identically.

EXAMPLES 4–6

In these examples the active alumina grains mentioned in Example 1 were treated so as to contain 3 wt% of Ce, and the quantities of the Ce-containing active alumina and ceria powder in the coating slip were varied. The quantity of the Ce-containing active alumina was 1419 g in Example 4, 1007 g in Example 5 and 491 g in Example 6. The quantity of the ceria powder was 103 g in Example 4, 516 g in Example 5 and 1032 g in Example 6. Otherwise, the process of Example 1 was performed identically.

EXAMPLES 7–9

In these examples the active alumina grains mentioned in Example 1 were treated so as to contain 5 wt% of Ce. Otherwise, Examples 7, 8 and 9 were identical with Examples 4, 5 and 6, respectively.

EXAMPLE 10

A monolithic catalyst was produced in accordance with Example 1 except that palladium chloride was used in place of chloroplatinic acid in Example 1. The resultant catalyst contained 0.77 g of Pd and 0.13 g of Rh.

EXAMPLE 11

A monolithic catalyst was produced in accordance with Example 5 except that palladium chloride was used in place of chloroplatinic acid in Example 5. The resultant catalyst contained 0.77 g of Pd and 0.13 g of Rh.

EXAMPLE 12

The coating slip of Example 1 was applied to a different monolithic honeycomb carrier. This carrier was formed of cordierite and had a gross volume of 900 cm$^3$ and 300 cells per square inch of cross-sectional area and weighed about 500 g. The treated monolithic carrier was baked under the same conditions as in Example 1. The process of depositing metallic platinum and rhodium was carried out such that the catalyst of Example 12 contained 0.95 g of Pt and 0.16 g of Rh.

The evaluation test on the catalyst of Example 12 was performed by using a 1.8-liter automotive gasoline engine. In the endurance test the composition of the exhaust gas was as described hereinbefore, but the space velocity of the exhaust gas was about 100000 hr$^{-1}$ and the exhaust gas temperature at the outlet of the catalyst was 850° C.

For comparison, several monolithic catalysts were produced by the following methods, and these catalysts were subjected to the evaluation test described after Example 1 unless otherwise noted.

REFERENCE 1

A coating slip was prepared by first mixing 2563.0 g of the alumina sol described in Example 1 with 1437.0 g of the active alumina grains (not containing cerium) described in Example 1 and thoroughly mixing and grinding the mixture in a ball mill for 6 hr. This coating slip was applied to the monolithic carrier described in Example 1, followed by baking at 650° C. for 2 hr. On each monolithic carrier the thus formed coating weighed 340 g. After that the deposition of metallic platinum and rhodium on the oxide-coated monolithic carrier was carried out in the same manner as in Example 1 except that the concentrations of the platinum and rhodium compounds in the mixed solution were varied such that the catalyst of Reference 1 contained 1.9 g of Pt and 0.19 g of Rh.

REFERENCE 2

The coating slip of Reference 1 was modified by using 1437.0 g of the active alumina grains containing 5 wt% of Ce in oxide form in place of the untreated active alumina grains in Reference 1. Otherwise, the process of Reference 1 was repeated identically.

REFERENCE 3

A coating slip consisting of 2478 g of the aforementioned alumina sol and 1522 g of the commercial ceria powder was used in place of the coating liquid of Reference 1. Otherwise, the process of Reference 1 was repeated identically.

REFERENCE 4

A coating slip was prepared by mixing 2563.0 g of the aforementioned alumina sol, 1367.2 g of active alumina grains containing 0.5 wt% of Ce in oxide form and 69.8 g of the commercial ceria powder in a ball mill. Using this coating slip a monolithic catalyst was produced by the same process as in Example 1.

REFERENCE 5

A coating slip was prepared by mixing 2563 g of the aforementioned alumina sol, 31.9 g of active alumina grains containing 10 wt% of Ce in oxide form and 1405 g of the commercial ceria powder in a ball mill. Using this coating slip a monolithic catalyst was produced by the same process as in Example 1.

REFERENCE 6

A monolithic catalyst was produced in accordance with Reference 1 except that palladium chloride was used in place of chloroplatinic acid. The resultant catalyst contained 1.9 g of Pd and 0.19 g of Rh.

REFERENCE 7

The coating slip of Reference 1 was applied to the monolithic carrier described in Example 12 (900 cm$^3$, 300 cells). The treated carrier was baked under the same conditions as in Reference 1. The process of depositing platinum and rhodium was carried out such that the catalyst of Reference 7 contained 0.95 g of Pt and 0.16 g of Rh.

The evaluation test on the catalyst of Reference 7 was performed by the method described at the end of Example 12.

REFERENCE 8

In accordance with Reference 1, the monolithic carrier was provided with the active alumina base coating (340 g). The coated carrier was immersed in an aqueous solution of cerium nitrate, dried in air at 120° C. for 3 hr and then baked in air at 600° C. for 2 hr to thereby deposit 28 g of Ce in oxide form on the active alumina base coating. After that the platinum and rhodium deposition process of Reference 1 was performed identically.

REFERENCE 9

In a ball mill, 2563.0 g of a silica sol and 1437.0 g of active alumina grains containing 3 wt% of Ce in oxide form were thoroughly mixed and ground for 6 hr to thereby obtain a coating slip. This coating slip was applied to the monolithic carrier described in Example 1, followed by baking at 650° C. for 2 hr. The thus formed silica-alumina base coating weighed 340 g. The coated monolithic carrier was immersed in a mixed solution of chloroplatinic acid and rhodium chloride, dried and then baked at 600° C. in a stream of a mixed gas of hydrogen and nitrogen to thereby deposit 1.9 g of Pt and 0.19 g of Rh on the oxide-coated carrier.

TABLE 1

| Catalyst | Metals in Each Catalyst | | | | Conversions (%) | | |
|---|---|---|---|---|---|---|---|
| | Ce in Active Alumina (wt %) | Ce of Ceria Powder (g (wt % of coating)) | Pt(Pd) (g) | Rh (g) | HC | CO | NO |
| Ex. 1 | 1 | 17 (5) | 0.77 | 0.13 | 92 | 92 | 91 |
| Ex. 2 | 1 | 102 (30) | 0.77 | 0.13 | 92 | 93 | 92 |
| Ex. 3 | 1 | 170 (50) | 0.77 | 0.13 | 93 | 93 | 91 |
| Ex. 4 | 3 | 17 (5) | 0.77 | 0.13 | 93 | 94 | 92 |
| Ex. 5 | 3 | 85 (25) | 0.77 | 0.13 | 93 | 94 | 93 |
| Ex. 6 | 3 | 170 (50) | 0.77 | 0.13 | 93 | 94 | 94 |
| Ex. 7 | 5 | 17 (5) | 0.77 | 0.13 | 94 | 94 | 92 |
| Ex. 8 | 5 | 85 (25) | 0.77 | 0.13 | 94 | 94 | 93 |
| Ex. 9 | 5 | 170 (50) | 0.77 | 0.13 | 95 | 95 | 94 |
| Ex. 10 | 1 | 17 (5) | (0.77) | 0.13 | 90 | 91 | 89 |
| Ex. 11 | 3 | 85 (25) | (0.77) | 0.13 | 92 | 91 | 91 |
| Ex. 12 | 1 | 9 (5) | 0.95 | 0.16 | 90 | 89 | 89 |
| Ref. 1 | — | — | 1.9 | 0.19 | 69 | 60 | 61 |
| Ref. 2 | 5 | — | 1.9 | 0.19 | 70 | 62 | 63 |
| Ref. 3 | — | 170 (50) | 1.9 | 0.19 | 75 | 66 | 65 |
| Ref. 4 | 0.5 | 10.2 (1.5) | 0.77 | 0.13 | 80 | 81 | 79 |
| Ref. 5 | 10 | 187 (55) | 0.77 | 0.13 | 95 | 95 | 94 |
| Ref. 6 | — | — | (1.9) | 0.19 | 68 | 60 | 60 |
| Ref. 7 | — | — | 0.95 | 0.16 | 69 | 59 | 60 |
| Ref. 8 | — | (28)* (8.2) | 1.9 | 0.19 | 71 | 63 | 65 |
| Ref. 9 | 3 | — | 1.9 | 0.19 | 70 | 63 | 62 |

*Ceria was formed from cerium nitrate on the coating surface.

In the following examples a zirconia powder was used together with a ceria powder. The catalysts of these examples were subjected to the evaluation test described at the end of Example 1. The results are shown in Table 2 together with the particulars of the respective catalysts.

EXAMPLE 13

In a ball mill, 2560.3 g of the alumina sol mentioned in Example 1, 1317.1 g of active alumina grains containing 1 wt% of Ce, 98.3 g of a commercial ceria powder and 21.6 g of a commercial zirconia powder were thoroughly mixed and ground for 6 hr to obtain a coating slip. The monolithic carrier described in Example 1 was treated with this coating slip, drained, dried and then baked in air at 650° C. for 2 hr. The resultant coating weighed 340 g. In this coating the amount of Ce of the ceria powder was 17 g (5 wt%) and the amount of Zr of the zirconia powder was 3.4 g (1 wt%). Using an aqueous mixed solution of chloroplatinic acid and rhodium chloride, 0.82 g of Pt and 0.082 g of Rh were deposited on the oxide-coated carrier by the same method as in Example 1.

EXAMPLE 14

The coating slip of Example 13 was modified by using 880.8 g of active alumina grains containing 3 wt% of Ce in place of the Ce-containing active alumina (Ce 1 wt%) in Example 13 and increasing the ceria powder to 491.3 g and the zirconia powder to 64.8 g. Otherwise, the process of Example 13 was repeated identically.

EXAMPLE 15

In place of the Ce-containing active alumina in Example 13 use was made of 238.2 g of active alumina grains containing 5 wt% of Ce. The coating slip of Example 13 was further modified by increasing the ceria powder to 982.7 g and the zirconia powder to 216.1 g. Otherwise, the process of Example 13 was repeated identically.

EXAMPLE 16

A monolithic carrier was produced in accordance with Example 13 except that an aqueous solution of chloroplatinic acid was used in place of the mixed solution in Example 13. This catalyst contained 0.82 g of Pt.

EXAMPLE 17

A monolithic carrier was produced in accordance with Example 13 except that palladium chloride was used in place of rhodium chloride. This catalyst contained 0.82 g of Pt and 0.082 g of Pd.

REFERENCE 10

In a ball mill, 2563.0 g of the aforementioned alumina sol, 1220.9 g of the active alumina grains (not containing Ce) mentioned in Example 1 and 216.1 g of commercial zirconia powder were thoroughly mixed and ground for 6 hr to obtain a coating slip. The monolithic carrier described in Example 1 was treated with this coating slip, drained, dried and baked in air at 650° C. for 2 hr. The resultant coating weighed 340 g. Using an aqueous mixed solution of chlorolatinic acid and rhodium chloride, 1.9 g of Pt and 0.19 g of Rh were deposited on the zirconia-containing active alumina coating.

REFERENCE 11

The monolithic carrier described in Example 1 was treated with the coating slip of Reference 1 and then baked as in Reference 1.

The coated monolithic carrier was immersed in an aqueous mixed solution of cerium nitrate and zirconium nitrate, dried and then baked in air at 650° C. for 1 hr to thereby form ceria and zirconia on the active alumina coating. The thus processed coating weighed 316 g. In this coating the quantity of Ce of the formed ceria was 20 g and the quantity of Zr of the formed zirconia was 3.4 g. After that 1.9 g of Pt and 0.19 g of Rh were deposited on the coated carrier by the same method as in Reference 1.

TABLE 2

| Catalyst | Ce in Active Alumina (wt %) | Ce of Ceria Powder (g (wt % of coating)) | Zr of Zirconia Powder (g (wt % of coating)) | Pt (g) | Rh(Pd) (g) | Conversion (%) | | |
|---|---|---|---|---|---|---|---|---|
| | | | | | | HC | CO | NO |
| Ex. 13 | 1 | 17 (5) | 3.4 (1) | 0.82 | 0.082 | 92 | 93 | 91 |
| Ex. 14 | 3 | 85 (25) | 10.2 (3) | 0.82 | 0.082 | 95 | 95 | 93 |
| Ex. 15 | 5 | 170 (50) | 34 (10) | 0.82 | 0.082 | 94 | 95 | 94 |
| Ex. 16 | 1 | 17 (5) | 3.4 (1) | 0.82 | — | 91 | 91 | 90 |
| Ex. 17 | 1 | 17 (5) | 3.4 (1) | 0.82 | (0.082) | 91 | 90 | 90 |
| Ref. 10 | — | — | 34 (10) | 1.9 | 0.19 | 70 | 63 | 64 |
| Ref. 11 | — | (20)[*1] | (3.4)[*2] | 1.9 | 0.19 | 81 | 80 | 81 |

[*1]Ceria was formed from cerium nitrate on the coating surface.
[*2]Zirconia was formed from zirconium nitrate on the coating surface.

What is claimed is:

1. A method of producing a monolithic catalyst for simultaneous oxidation of carbon monoxide and hydrocarbons and reduction of nitrogen oxides in exhaust gases of internal combustion engines, the method including the steps of providing an active alumina base coating to a monolithic carrier by treating the monolithic carrier with a coating slip in which an active alumina powder containing cerium oxide, which is formed by thermal decomposition of a cerium salt applied to said active alumina as a solution, is dispersed and then baking the treated carrier, and depositing at least one noble metal selected from the group consisting of Pt, Rh and Pd on said coating by thermal decomposition of an aqueous solution of a compound of each selected noble metal on said coating, characterized in that a ceria powder is additionally dispersed in said coating slip; wherein the amount of said ceria powder is such that, in said coating, Ce of said ceria powder amounts to 5 to 50% by weight of said coating, and wherein the content of Ce in said active alumina powder is in the range from 1 to 5% by weight.

2. A method according to claim 1, further comprising the step of additionally dispersing such an amount of a zirconia powder in said coating slip that, in said coating, Zr of said zirconia powder amounts to 1 to 10% by weight of said coating.

3. A method according to claim 1, wherein the baking for producing said coating is carried out at a temperature in the range from 500° to 700° C.

4. A method according to claim 1, wherein said coating slip is an aqueous suspension and comprises hydrated alumina besides said active alumina powder.

* * * * *